United States Patent [19]

Yoshioka et al.

[11] 4,374,160
[45] Feb. 15, 1983

[54] METHOD OF MAKING A NON-LINEAR VOLTAGE-DEPENDENT RESISTOR

[75] Inventors: Nobuyuki Yoshioka, Fujisawa; Tsutai Suzuki, Tokyo; Masanori Haba, Kashiwa; Hideo Koyama, Tokyo, all of Japan

[73] Assignee: Kabushiki Kaisha Meidensha, Tokyo, Japan

[21] Appl. No.: 245,147

[22] Filed: Mar. 18, 1981

[51] Int. Cl.³ .......................... B05D 5/12; H01C 7/10
[52] U.S. Cl. ................................ 427/101; 29/610 R; 252/518; 252/521; 338/21; 427/126.3
[58] Field of Search ............. 29/610 R; 252/518, 521; 338/21; 427/101, 126.3

[56] References Cited

U.S. PATENT DOCUMENTS 4,031,498  6/1977  Hayashi et al. ..................... 338/21
4,060,661  11/1977  Takami et al. .................. 427/101 X

*Primary Examiner*—Michael R. Lusignan
*Attorney, Agent, or Firm*—Lowe, King, Price & Becker

[57] ABSTRACT

There is provided a method of making a non-linear voltage-dependent resistor containing a ZnO element including zinc oxide as its major component by forming or coating a layer of high insulation material on the element. The layer is formed due to a vapor-solid reaction in the atmosphere of a vaporizable molecular compound containing $Sb_2O_3$, $Bi_2O_4$ or $SiO_2$ at a sintering temperature. Preferably, the layer is formed due to a vapor-solid reaction in the atmosphere of a vaporization retarding compound containing ZnO, or $SiO_2$ in addition to the vaporizable molecular compound at a sintering temperature within a sintering vessel.

23 Claims, 40 Drawing Figures

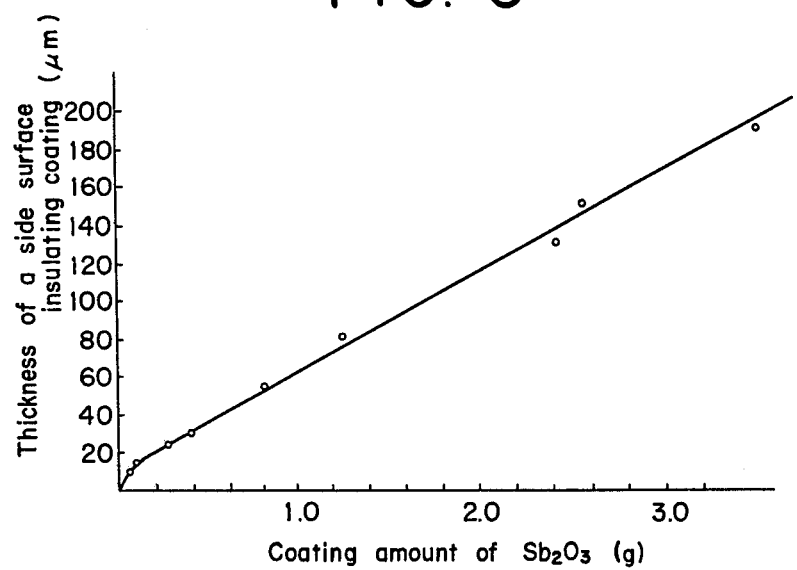

40μ

20μ

20μ

20μ

20μ

20μ

20μ

20μ

20μ

20μ

20μ

20μ

40μ

20μ

20μ

20μ

40μ

20μ

20μ

20μ

METHOD OF MAKING A NON-LINEAR VOLTAGE-DEPENDENT RESISTOR

BACKGROUND OF THE INVENTION

The present invention relates to a method of making a non-linear voltage dependent resistor containing a ZnO element including zinc oxide as its major component. Specifically, the present invention relates to a method of making a non-linear voltage dependent resistor by forming or coating a high insulating layer on the side surface of the element.

Heretofore, attempts have been widely made for effecting a side surface insulation to a non-linear voltage dependent resistor, for instance, including a ZnO (zinc oxide) element. One method uses a process which comprises the steps of sintering a shaped element, thereafter forming or coating an insulating layer of an organic substance, such as an epoxy compound, on the side surface of the sintered element.

Another method uses a process which comprises the steps of coating inorganic compounds on a shaped element which is not sintered, thereafter sintering the shaped element, and forming an insulating coating of glass or crystalline upon completion of the sintering step.

However, with the former method, the following drawbacks are pointed out. A first drawback is that the organic material, such as epoxy compound, to be coated and the element are not closely or densely packed. As a result, moisture is adsorbed into the element, thereby degrading its performance characteristics and reducing a high current withstand capability. A second drawback is that, because of a difference of thermal expansion between the element and the epoxy resin, there occur cracks in the epoxy resin coated on the side surface of the element due to thermal shock or impact, thereby degrading its performance characteristics.

A problem also arises with the latter method, wherein it is necessary to equalize a shrinkage ratio between the shaped element and the side surface insulating agent when sintering is effected. For this reason, there is actually employed the method of primarily sintering the element so that the formed element is shrunk by a desired volume ratio, thereafter coating an inorganic compound or mixture thereof on the side surface of the element, and sintering the element to form the insulating coating of an inorganic material. According to the last mentioned method, two sintering steps are required. As a result, the cost required for fabricating the resistor increases because of the fact that the fuel fee required for heat generation in this case is twice as large as that required for the single sintering step. Further, another drawback is apparent, in that the sintering apparatus is used tiwce, thereby reducing the durability thereof. Furthermore, with the latter method, there occurs the following unfavorable phenomenon in view of the non-linear voltage dependent characteristic: During sintering, $Bi_2O_3$ vaporizes from the element. For this reason, there occur losses in uniformity of the thickness, which determines the degree of the non-linearlity of the element, of a grain boundary of $Bi_2O_3$. Moreover, the sintering being carried out in this instance is effected as a liquid phase sintering due to a liquid phase of $Bi_2O_3$. As a result, there occur losses in uniformity in the speed growth of ZnO crystal structure, thereby lowering the non-linear voltage dependent characteristic.

With both the abovementioned methods, a further drawback pointed out is that skilfulness in technique and a complicated device are required for making it possible to effect a control so that the thickness of the coating becomes uniform.

SUMMARY OF THE INVENTION

With the above in mind, an object of the present invention is to provide a method of making a non-linear voltage dependent resistor wherein the resistor is fabricated by forming an electrically insulating layer to a resistance element constituting the resistor;

Another object of the present invention is to provide a method of making a non-linear voltage dependent resistor, wherein a crystal structure of the resistance element is free from pinholes, fine and uniform;

Another object of the present invention is to provide a method of making a non-linear voltage dependent resistor wherein an electrically insulating layer formed on the resistance element is closely or densely packed;

Another object of the present invention is to provide a method of making a non-linear voltage dependent resistor having improved resistance characteristics, little degradation of the element characteristics, such as an improved current discharge withstand voltage, corona withstand voltage, or arc withstand voltage.

One aspect of the invention is that a method of making a non-linear voltage dependent resistor comprising a non-linear resistance element containing a ZnO element including zinc oxide as a major component by forming an electrically insulating layer on the resistance element is characterized in that the layer is formed due to a vapor-solid reaction caused by a vaporisable molecular compound which reacts with the zinc oxide at a sintering temperature range.

Another aspect of the invention is that a method of making a non-linear voltage dependent resistor comprising a non-linear resistance element containing a ZnO element including zinc oxide as a major component by forming an electrically insulating layer on the resistance element is characterized in that a desired compound capable of using as a vaporisable molecular compound which reacts with the zinc oxide at a sintering temperature within a sintering vessel is disposed, and that the layer is formed due to a vapor-solid reaction caused by the vaporisable molecular compound.

BRIEF DESCRIPTION OF THE DRAWINGS

The features and advantages of a making a non-linear voltage dependent resistor according to the present invention will become more apparent from the following description taken in conjunction with the accompanying drawings, in which:

FIG. 3 is a graph illustrating a relationship between a coating amount of antimony oxide and the thickness of an electrically insulating layer formed on the side surface of the element;

DETAILED DESCRIPTION OF THE PREFERRED EMBODIMENTS

Figure 1:
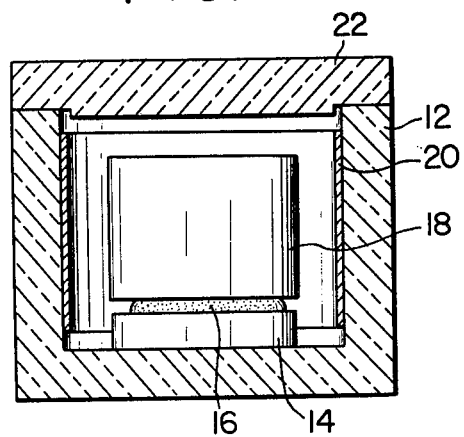
FIG. 1 is a cross sectional front view illustrating a preferred embodiment of a sintering capsule suitable for a method of making a non-linear voltage-dependent resistor of the invention.
Figure 2:
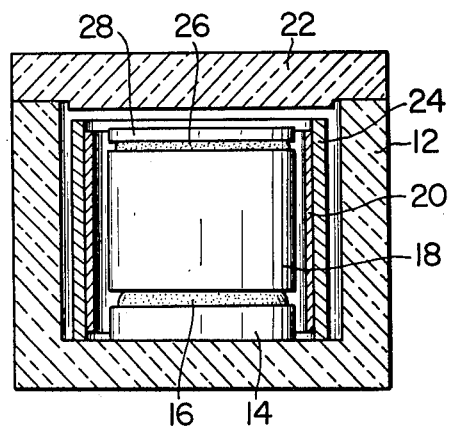
FIG. 2 is a cross sectional front view illustrating the other preferred embodiment of a sintering capsule suitable for a method of making a non-linear voltage-dependent resistor of the invention.

FIGS. 1 and 2 show a preferred embodiment of a sintering vessel according to the present invention.

Referring to FIG. 1, a base member 14 is mounted on a bottom of a capsule 12 (sintering vessel) of alumina ceramics. An element 18 is mounted on the base member 14 through a layer of a seating member 16 consisting of a granulated powder. The seating member 16 is provided for preventing the thermal adhesion of base member 14 to the element 18. At the inner side surface of the capsule 12 is coated a coating agent 20 for forming a side surface insulating coating. At the upper end of the capsule 12, there is provided a cap member 22 made of the same material as the capsule 12.

It is preferable that the base member 14 is formed with a material of an alumina or ZnO element compound mixture. Specifically, the ZnO element compound mixture is preferable since there is not any possibility that the characteristics are not degraded because of the fact that the ZnO element compound mixture is made of the same material as that of the element. As for a material of the seating member 16, a granulated powder of alumina or ZnO element or a powder obtained by presintering ZnO element and cracking it may be used. In regard to the seating member 16, it is strongly required that the material of the seating member 16 is made of a material similar to that of the composition of the ZnO element. It is noted that if the base member 14 is made of the same material as that of the element 18, the seating member 16 is not required. It is sufficient that the coating agent 20 for forming a side surface insulating coating is coated on a partial or whole surface of the inner wall of the capsule 12 and the bottom surface of the capsule 12.

Referring to FIG. 2 illustrating a modification of the sintering vessel, an auxiliary member 24 having the same material as that of the capsule 12 and the cap member 22 is provided along the inner side surface thereof. On the inner surface (or both surfaces of inner and external surfaces thereof), the coating agent 20 is coated. The upper surface of the element 18 is covered with a seating member 26 and a ceramic plate 28 in order to prevent the formation of an insulating coating.

The auxiliary member 24 used in the sintering vessel shown in FIG. 2 has a mechanical strength sufficient to withstand the numerous repetitions of mounting thereof. Since there is little possibility that there occurs heat deformation which may be caused by repetition of the numerous sintering operations, a thin plate may be used as the auxiliary member 24, thereby making it possible to reduce the cost thereof. For this reason, even if the material of the auxiliary member 24 degrades due to the repetition of the numerous sintering operations, with the result that the characteristic of the side surface insulating coating lowers, it is possible to easily detach the auxiliary member 24. Further, since the coating agent 20 is not coated on the capsule 12 and the cap member 22, both of which are relatively expensive, there is little possibility that there will occur a deterioration of the material of the capsule 12 and the cap member 22. For this reason, the capsule 12 and the cap member 22 are capable of withstanding the repetition of the numerous sintering operations. As a result, the sintering vessel shown in FIG. 2 is particularly suitable when sintering a plurality of elements having a small radius in a capsule having a large inner volume.

Reference is made to a method of forming a side surface insulation.

First, a method of making the abovementioned element 18 is described as follows:

A quantity (for example, 91 weight %) of powdered ZnO is added to a second predetermined quantity (for example, a total of 9 weight %) of a mixture or a vaporisable molecular compound containing, for example, $Sb_2O_3$ (antimony oxide), $Bi_2O_3$ (bismuth oxide), $Co_3O_4$ (cobalt oxide), $Cr_2O_3$ (chromium oxide), $MnO_2$ (manganese oxide), and $SiO_2$ (silicon oxide), and then the former is fully mixed with the latter. The mixture thus obtained is then pressed in a mold into a shaped element having a desired shape, for example, a disc of 40 mm in diameter and 30 mm in thickness.

Second, a method of preparing the coating agent 20 is described as follows: An antimony oxide compound containing at least one of $Sb_2O_3$, $Sb_2O_4$ and $Sb_2O_5$ as a raw material is changed to a coating slurry which serves as the coating agent 20 by adding a predetermined quantity of water. The coating agent thus obtained is coated on an inner side surface of the capsule 12 or on the auxiliary member 24, and then dried.

The disk shaped element 18 is placed in the capsule 12 in which the coating agent 20 is coated. The capsule 12 is covered with the cap member 22 so as to realize a substantially air tight condition. In this air tight condition, when the element 18 is sintered within the temperature range from 1,000° C. to 1,400° C. (preferably, from 1,100° C. to 1,300° C. in view of the electric characteristic of the element), the antimony oxide serving as the coating agent 20 provided in the capsule 12 sublimates, with the result that the inside of the vessel is exposed to the presence of the antimony oxide. Thus, the antimony oxide reacts with ZnO or $Bi_2O_3$ on the surface of the element 18 due to a solid-vapor reaction, whereby an insulating coating having a high resistance is formed on the surface of the element 18.

In the abovementioned solid-vapor reaction, $Sb_2O_3$ is changed into $Sb_2O_4$ selected from a plurality of compounds of the antimony oxide at about 570° C., and $Sb_2O_5$ is changed into $Sb_2O_4$ at a temperature higher than 357° C. The $Sb_2O_4$ thus obtained starts to sublimate from a temperature of about 920° C. When the temperature is above 1,000° C., the reaction of $Sb_2O_4$ becomes active. Thus, the inside of the capsule 12 is in the presence of antimony oxide.

On the other hand, the element 18 is shrunk by 40 percent in terms of a volume ratio. Thus, there is formed a crystalline phase, such as, $Zn_2SiO_4$, pyrochlore ($Zn_2Bi_3Sb_3O_{14}$), $Zn_{2.33}Sb_{0.67}O_4$, and 14 $Bi_2O_3$-$Cr_2O_3$. On the surface of the element 18, an antimony oxide produced within the sintering vessel reacts with $Zn^{2+}$ which diffuses from the interior of the element 18. As a result, $Zn_{2.33}Sb_{0.67}O_4$ is formed on the surface of the element 18 together with the sintering of the element 18.

FIG. 3 is a graph illustrating a relationship between a thickness of the side surface insulating coating and an amount of coating of $Sb_2O_3$. In this case, measurement for presenting the relationship is effected as follows: The coating agent ($Sb_2O_3$) 20 is coated on the inner wall of the sintering vessel, shown in FIG. 1, having inner volume of 100 mml by varying the amount thereof. After drying, two disks of element 18 each having a diameter of 40 mm and a thickness of 8 mm are mounted on the base member 14. The value plotted on the abscissa of FIG. 3 shows the thickness of the side surface insulating coating under the condition that the abovementioned elements are sintered at 1,200° C. As is clear from the drawing, when the coating agent of more than 0.1 g is coated, the coating amount is linearly proportional to the coated thickness. It is understood that a desired thickness of the coating is easily formed by adjusting the coating amount.

Figure 4A:
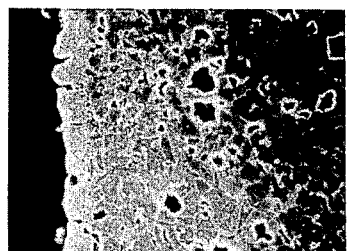
FIGS. 4A to 4D are photos each illustrating a secondary electron image by X-ray microanalyzer and a characteristic X-ray of Sb, and Zn.
Figure 4B:
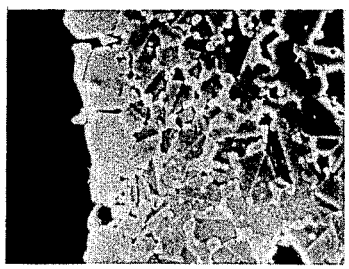
Figure 4C:
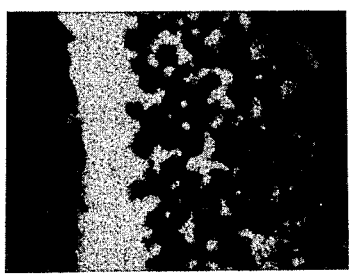
Figure 4D:
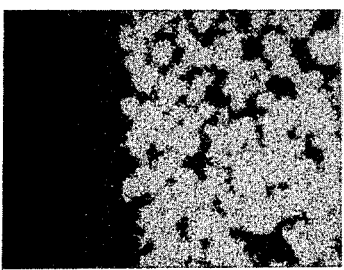
Figure 5A:
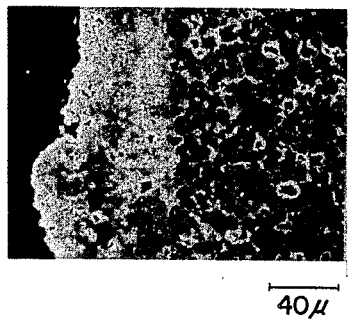
FIGS. 5A to 5D are photos each illustrating a secondary electron image by X-ray microanalyzer and a characteristic X-ray image of Sb and Zn.
Figure 5B:
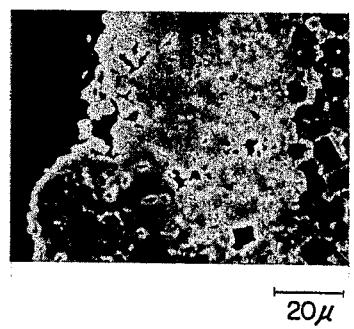
Figure 5C:
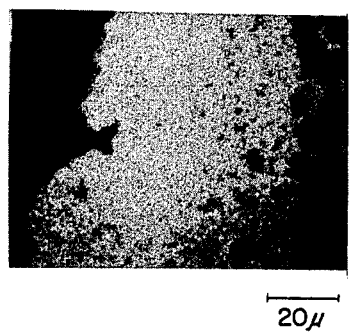
Figure 5D:
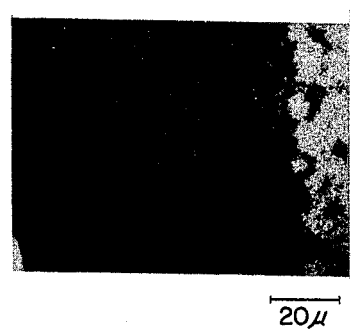

FIGS. 4A to 4D, and 5A to 5D are photos each showing a Secondary Electron Image by an X-ray microanalyzer of a side surface insulating coating and a Characteristic X-ray Image of Sn and Zn. FIGS. 4A to 4D shows the case that $Sb_2O_3$ of 0.5 g is coated as a coated agent 20 where FIGS. 4A and 4B show a secondary electron image (the scale of FIG. 4B is twice as large as that of FIG. 4A), FIG. 4C shows a characteristic X-ray image of Sb, and FIG. 4D shows a characteristic X-ray image of Zn. As is clear from FIGS. 4C and 4D, the side surface coating, containing a rich layer of Sb having a width of about 20µ (micro meter), is formed. It is known that Zn in the coating is diffused from the element, and the interface between the element and the coating is chemically bonded. Although not shown, according to the X-ray microanalyzer, it is seen that Bi, Cr, and Si contained in the element 18 is included in the coating so that a little amount thereof is diffused therein. FIGS. 5A to 5D show the case that $Sb_2O_3$ of 0.9 g is coated where the experimental condition of FIGS. 5A to 5D is the same as that of FIGS. 4A to 4D and the thickness of the cating is about 50 µm.

In accordance with X-ray diffraction measurement, it is observed that spinel formed during sintering sufficiently reacts with the element due to the fact that Co, Mn, and Cr existing in the element are solid-soluted in the spinel phase.

Figure 6:
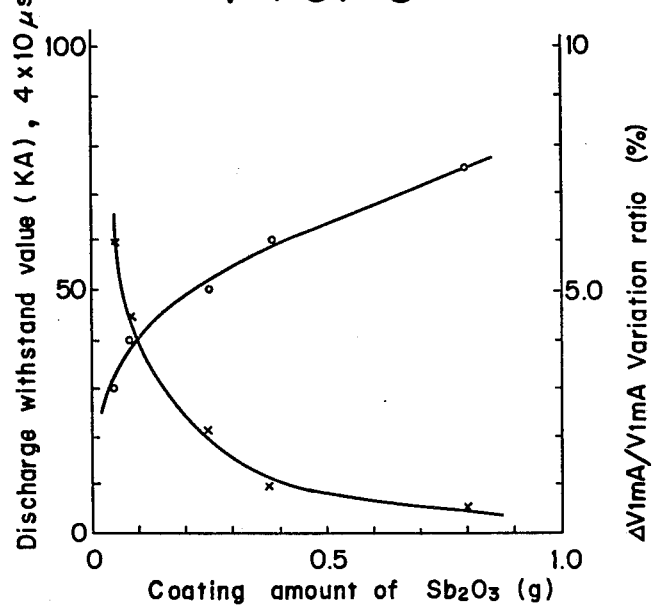
FIG. 6 is a graph illustrating a relationship between a coating amount of antimony oxide and electric characteristics of the element.

FIG. 6 is a graph illustrating a high current withstand capability of the element fabricated by the aforesaid method. It is here noted that the value of high current withstand capability is measured when an impulse of $4 \times 10$ µs is applied twice, and the variation rate is the value after an impulse of 30 KA is applied twice. It is seen that the side surface insulating coating having good characteristics can be obtained by varying the coating amount of $Sb_2O_3$. In FIG. 6, O designates a high current withstand capability and X designates a variation ratio.

Figure 7:
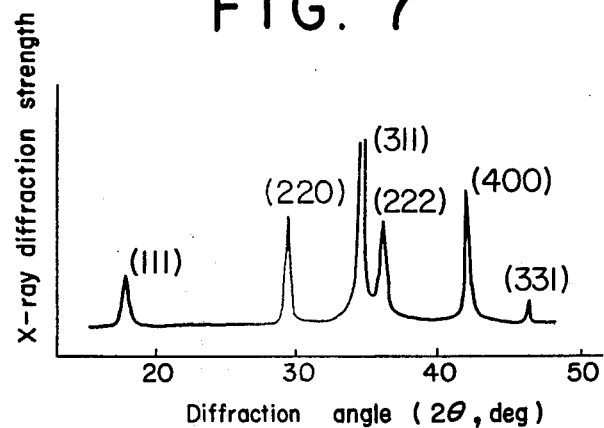
FIG. 7 is a characteristic curve illustrating an X-ray diffractive profile of a layer formed by a preferred first embodiment of the method according to the present invention.

FIG. 7 is a characteristic curve illustrating an X-ray diffractive profile of a coating formed by the abovementioned first embodiment of the method according to the present invention.

The feature of the forming the side surface insulating coating as described above resides in vapor-solid phase reaction. Since it is unnecessary to coat the side surface insulating film forming agent on the element, the following three sintering methods are available.

The first method comprises the step of pressing the ZnO element in a mold to form a predetermined shaped element, and heating the element in a sintering vessel as constructed in FIGS. 1 and 2 to effect a sintering for a predetermined time.

The second method comprises the steps of effecting a pre-sintering in order to shrink or contract the pressed shaped ZnO to some extent, and then effecting a sintering in the sintering vessel.

The third method comprises the step of sintering the ZnO element by gradually elevating the temperature in the sintering vessel. The detail of this last mentioned method comprises the steps of heating the element at a temperature below the temperature at which vapor solid phase reaction starts, shrinking the ZnO element so as to have the same effect as that of pre-sintering, thereafter heating at a predetermined temperature and time sufficient to maintain a vapor solid phase reaction and various kinds of characteristics of the element, thereby obtaining the non-linear voltage dependent resistor on which a side surface insulating coating is formed. The sintering of the element is effected by forming a side surface insulating coating in accordance with the above described embodiment.

According to the present embodiment, in order to achieve the object, it is sufficient to sinter the ZnO element 18 in an atmosphere of antimony oxide over a predetermined range of sintering temperature. Accordingly, as compared with a method of coating an inorganic side surface agent, it is unnecessary to rigorously take into account the ratio of contraction or shrinkage between the element and the inorganic side surface agent, thereby making it easy to obtain a side surface insulator of high resistance.

Since the side surface insulating coating is formed by utilizing a vapor-solid phase reaction, the element is densely packed with the insulating coating thereby making it possible to obtain an insulating coating having a fine and uniform crystal structure free from pinholes. Accordingly, this makes it possible to considerably improve the electric characteristics of the element, such as high electric withstand voltage, corona electric withstand voltage, or arc withstand voltage as compared with the situation in which the element is coated with an epoxy resin. Further, in comparison with the situation in which an inorganic side surface agent is coated on the side surface of the element and then sintered, it is possible to obtain an element having the same characteristic as that of the abovementioned case.

As is clear from the foregoing description, a method of forming a side surface insulating coating of a non-linear dependent voltage resistor according to the first embodiment of the invention is characterized in that the ZnO element is sintered in the presence of an atmosphere of antimony oxide. Accordingly, this method makes it possible to form an insulating coating having a uniform crystal structure free from pinholes. Further, according to the method of the invention, there is little deterioration in the characteristics of the element. Furthermore, high current withstand voltage, corona withstand voltage or arc characteristic are greatly improved.

Reference is now made of a second preferred embodiment of a method of making a non-linear voltage dependent resistor according to the present invention. The sintering vessel shown FIGS. 1 and 2 is applicable to this embodiment. The resistance element 18 is fabricated by the same method as set forth in connection with the first embodiment of the invention. The complied element 18 is formed with a disk of 40 mm in diameter and 30 mm in thickness.

The coating agent 20 is weighted so that mol percent of $Sb_2O_3$ and $Bi_2O_3$ is selected as shown in the following Table as a raw material.

In this embodiment, there is used a coating slurry obtained by adding a suitable amount of water to the raw material sufficiently mixing therewith.

|   | $Sb_2O_3$(mol %) | $BiO_3$ (mol %) |
| --- | --- | --- |
| 1 | 95 | 5 |
| 2 | 90 | 10 |
| 3 | 85 | 15 |
| 4 | 80 | 20 |
| 5 | 75 | 25 |
| 6 | 70 | 30 |
| 7 | 65 | 35 |
| 8 | 60 | 40 |

The coating agent 20 thus obtained is coated on the inner wall of a sintering vessel having the same construction as that shown in FIG. 1 and then dried (a quantity of about 2 gram of the coating agent 20 is coated in a sintering vessel of which inner volume is 200 ml). The element 18 containing ZnO as a major component is accommodated in the capsule 12. The capsule 12 is then covered with cap member 22, thereby rendering the interior thereof to a substantially air tight condition.

In this air tight condition, the element 18 is sintered at a temperature range from 1,000° C. to 1,400° C. (preferably, from 1,100° C. to 1,300° C. in view of the electric characteristic of the element).

Antimony oxide and bismuth oxide serving as coating agent 20 within the capsule 12 are sublimated and vaporized. Thereby, the interior of the vessel is provided with an atmosphere of an antimony oxide and bismuth oxide. These materials react with the ZnO element and additive mixture and the like on the surface of the element 18. Thus, an insulating coating of high resistance is formed on the surface of the element 18.

In the abovementioned solid-vapor reaction, $Sb_2O_3$ selected from $Sb_2O_3$ and $Bi_2O_3$ coated in the sintering vessel is changed into $Sb_2O_4$ at 570° C., and starts to sublimate at 920° C. As a result, $Sb_2O_3$ becomes very active when the temperature thereof is above 1,000° C. $Bi_2O_3$ is melted at 820° C., whereby the high concentration of the atmosphere of vaporisable molecular compound containing antimony oxide and bismuth oxide is filled within the vessel at a temperature more than 1,000° C.

On the other hand, the element 18 is shrunk by 40 percent in terms of volume ratio in a temperature range from 800° C. to 1,000° C. Thus, ZnO, and other crystalline layer, such as pyroclore, $Zn_2SiO_4$, $Zn_{2.33}Sb_{0.67}O_4$, $Bi_2O_3$, 14 $Bi_2O_3$ $Cr_2O_3$ are formed. $Bi_2O_3$ starts to vaporize on the surface of the element as the temperature elevates. However, the amount of vaporization is considerably suppressed due to the fact that the sintering capsule is in the atmosphere of $Bi_2O_3$.

$Sb_2O_3$ in the above atmosphere reacts with the element, whereby $Zn_{2.33}Sb_{0.67}O_4$ is formed on the surface of the element. $Bi_2O_3$ in the atmosphere and the element urges the reaction between the element and $Sb_2O_3$ in the atmosphere. This compound is sintered together with the element. Thus, a non-linear voltage dependent resistor on which a side surface insulating coating having a fine and uniform crystal structure is fabricated.

FIGS. 8 and 9 are photos of an experimental insulating layer formed on the surface of the element sintered by using a coating agent containing $Sb_2O_3$ and $Bi_2O_3$, with an X-ray microanalyzer.

Figure 8A:
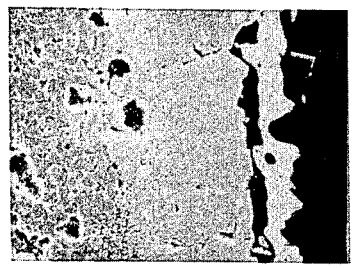
FIGS. 8A to 8D are photos each illustrating an insulating layer observed by an X-ray microanalyzer.
Figure 8B:
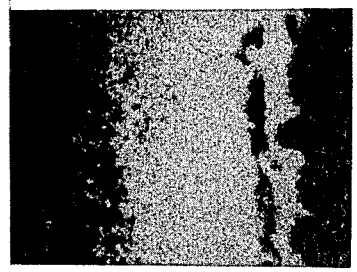
Figure 8C:
Figure 8D:

Referring FIG. 8, it is shown that 60 $Sb_2O_3$-40 $Bi_2O_3$ is coated where FIG. 8A denotes a secondary electron image, FIGS. 8B to 8D denote a characteristic X-ray image of Sb, Zn and Bi, respectively. From these photos, it is understood that there is provided a side surface layer rich in Bi on the insulating coating.

Figure 9A:
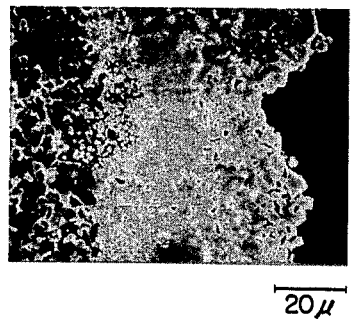
FIGS. 9A to 9D are photos each illustrating an insulating layer observed by an X-ray microanalyzer.
Figure 9B:
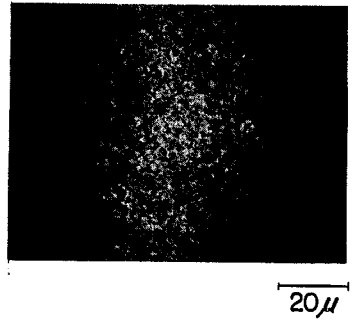
Figure 9C:
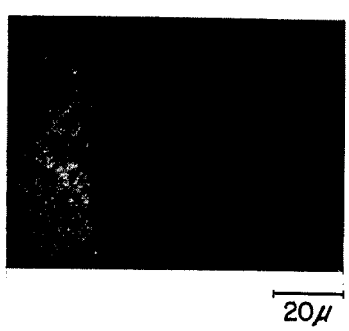
Figure 9D:
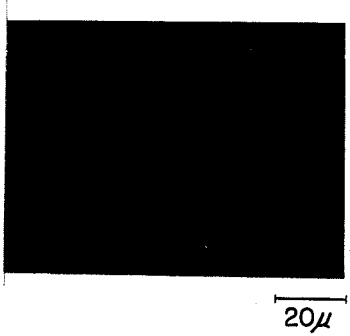

Further, referring to FIG. 9 it is shown that 80 $Sb_2O_3$-20 $Bi_2O_3$ is coated, where FIG. 9A shows a secondary electron image, and FIGS. 9B to 9D denote a characteristic X-ray image of Sb, Zn and Bi, respectively.

Figure 15:
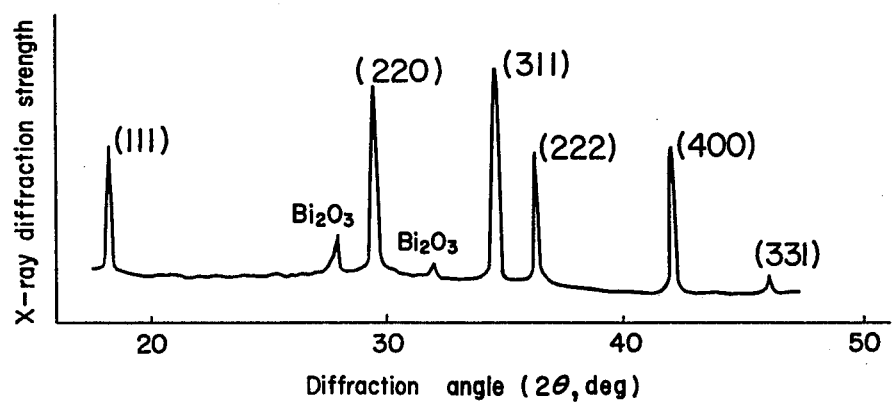
FIG. 15 is a characteristic curve illustrating an X-ray diffractive profile of a layer.

Although not shown in FIG. 8, as understood from an X-ray diffractive profile shown in FIG. 15, the coating is formed with spinel ($Zn_{2.33}Sb_{0.67}O_4$). A small amount of $Bi_2O_3$ is mixed therein.

This spinel contains Co, Mn and Cr existing in the element under the condition that they are solid-soluted therein. From this, it is determined that the spinel formed on the surface of the element during sintering sufficiently reacts. Further, it is determined by a characteristic X-ray image of other X-ray microanalyzer not shown that Co, Mn, Cr and Si are solid-soluted.

Figure 10:
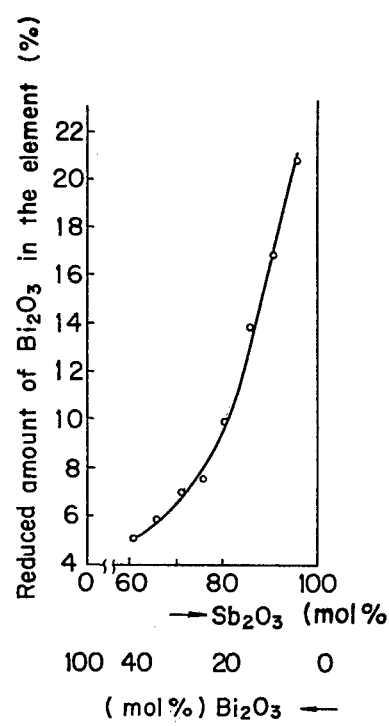
FIG. 10 is a graph illustrating a mixing ratio of $Sb_2O_3$ and $Bi_2O_3$ and a relationship of the reduced amount of $Bi_2O_3$ in the element.

FIG. 10 is a graph illustrating a chemical analysis data of $Bi_2O_3$ in the element obtained by sintering the element 18. As shown in Figure, it is understood that the spattering of $Bi_2O_3$ from the element is suppressed by the coating of $Bi_2O_3$.

Figure 11:
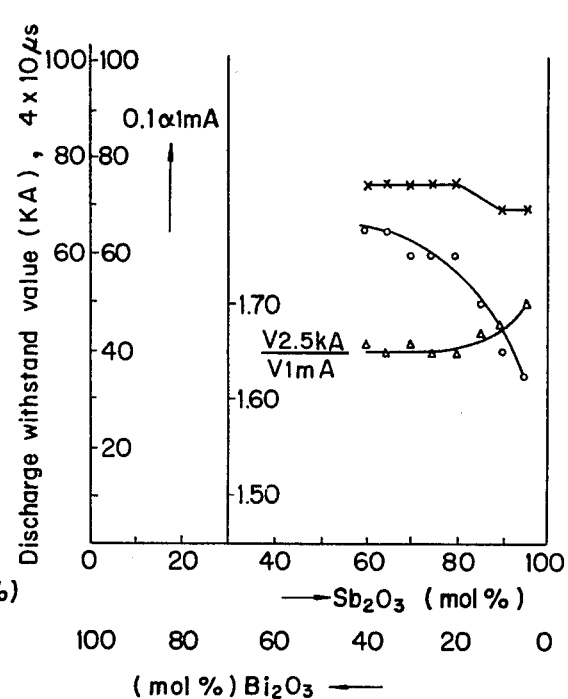
FIG. 11 is a graph illustrating a variation of mixing ratio of $Sb_2O_3$ and $Bi_2O_3$, and electric characteristics of the element.

FIG. 11 is a graph illustrating electric characteristics when fabricating the element in the sintering vessel by varying a mixing ratio of $Sb_2O_3$ and $Bi_2O_3$ to be coated where O denotes $0.1mAa1mA$, △ denotes $V_{2.5}KA/V_{1mA}$, and X denotes a high current withstand voltage ($4 \times 10$ µs—two times). When the amount of $Bi_2O_3$ decreases, $0.1mAa,mA$ decreases while $V_{2.5}KA/V_{1mA}$ increases, thereby lowering the high current withstand voltage. It is understood that their characteristics are suddenly changed when $Bi_2O_3$ is less than 20 mol %.

Figure 12:
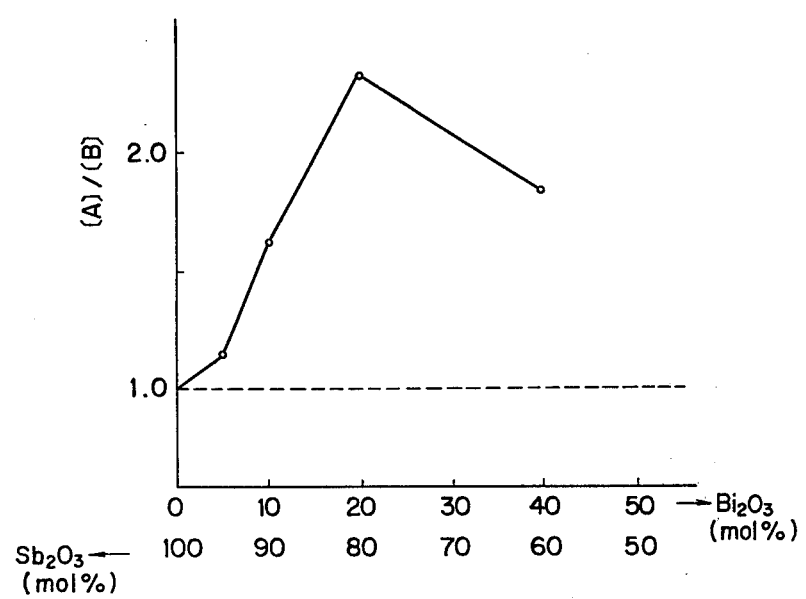
FIG. 12 is a graph illustrating a relationship between a mixing ratio of $Sb_2O_3$ and $Bi_2O_3$ in the sintering vessel and the thickness ratio of an insulating layer.

FIG. 12 is a view illustrating a relationship between the amount of $Bi_2O_3$ and the thickness of the insulating layer formed on the sintering element. Where reference mark A denotes a thickness of an insulating layer formed by the coating agent containing $Sb_2O_3$ and $Bi_2O_3$ and reference mark B denotes a thickness of an insulating layer formed by the coating agent solely containing $Sb_2O_3$. As is clear from figure, as the amount of $Bi_2O_3$ increases, the insulating layer becomes thicker. Specifically, until the amount of $Bi_2O_3$ is 20 mol %, the thickness of the insulating layer increases linearly. However, when the amount of $Bi_2O_3$ is above 30 mol %, Sb-Bi-Zn-O oxide layer is formed on the outside of $Zn_{2.33}Sb_{0.67}O_4$. As a result, $Bi_2O_3$ does not participate in the forming reaction of $Zn_{2.33}Sb_{0.67}O_4$ phase (spinel).

Figure 13:
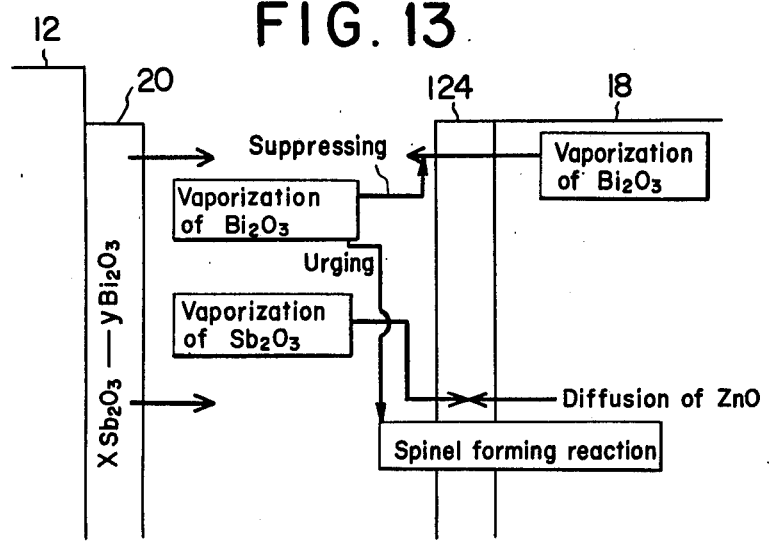
FIG. 13 is a diagram illustrating a process for forming an electrically insulating layer wherein $Bi_2O_3$ is less than 20 mol percent.

FIG. 13 shows a process for forming an insulating layer when the amount of $Bi_2O_3$ is less than 20 mol %. As understood from FIG. 13, $Bi_2O_3$ is completely vaporized from the coating agent 20, thereby suppressing vaporization of $Bi_2O_3$ from the element 18. $Bi_2O_3$ urges the formation of the spinel phase 124 formed by solid-vapor reaction between $Sb_2O_3$ and ZnO component in the ZnO element.

Figure 14:
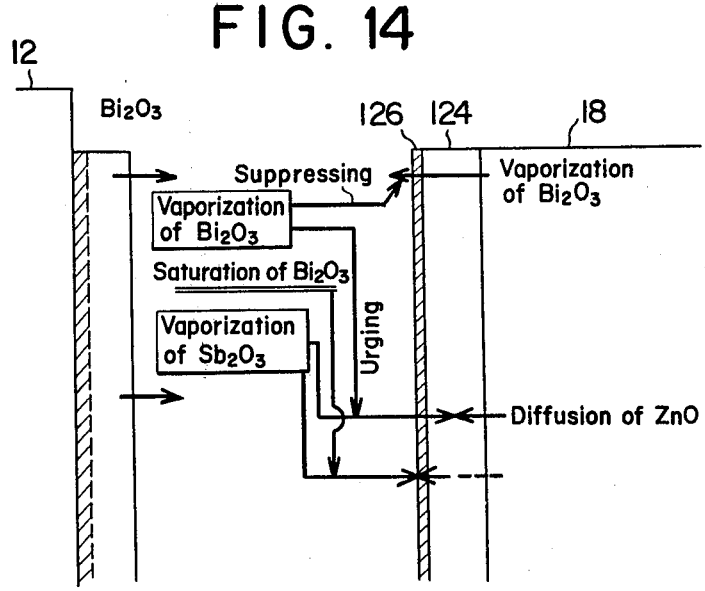
FIG. 14 is a diagram illustrating a process for forming an electrically insulating layer wherein $Bi_2O_3$ is more than 30 mol percent.

FIG. 14 shows a process for forming of the insulating layer when the amount of $Bi_2O_3$ is above 30 mol %. Since a substantial quantity $Bi_2O_3$ is provided at this ratio, $Bi_2O_3$ becomes saturated. Thus, the oxide material 126 of Sb-Bi-Zn-O is formed on the spinel phase 124. In this case, this formation does not contribute to the formation of spinel phase. There remains $Bi_2O_3$ in the coating agent 20. FIG. 15 is a characteristic curve illustrating an X-ray diffractive profile of the insulating layer formed by the second embodiment of the invention.

The aforesaid second embodiment according to the present invention is characterized in that the mixture of $Sb_2O_3$ and $Bi_2O_3$ is coated on the inner wall of the vessel for containing the element therein as a coating agent, and that ZnO element is sintered in the presence of $Sb_2O_3$ and $Bi_2O_3$ thereby fabricating the element. Accordingly, it is difficult to vaporize $Bi_2O_3$ from the ZnO element, thereby making it possible to fabricate a non-linear voltage dependent resistor having a non-linear voltage and current characteristics, that is, favorable electric characteristics, such as high current withstand voltage.

The atmosphere of $Bi_2O_3$ urges an insulating layer formation. Accordingly, this makes it possible to easily form an insulating layer of high resistance in a range of temperature for sintering the element.

As compared with coating an epoxy resin, the insulating layer has good electrical characteristics inherent in the element, thereby making it possible to fabricate the element having the same characteristic as that made by coating an inorganic side surface agent and sintering it. The spattering of bismuth oxide from ZnO element is suppressed, thereby making it possible to fabricate a uniform element.

As is clear from the foregoing description, a method of making a non-linear voltage dependent resistor according to the second embodiment of the invention is characterized in that ZnO element is sintered in the presence of mixed compound of an antimony oxide and bismuth oxide, thereby making it possible to form an insulating layer having a fine and uniform crystalline structure and densely packed with the element. The present method as defined in this embodiment makes it possible to provide a non-linear voltage dependent resistor which does not degrade the element characteristics, and is capable of improving voltage linearity and electric characteristics.

Reference is now made to the third preferred embodiment of a method of making a non-linear voltage dependent resistor according to the present invention. The sintering vessel shown in FIGS. 1 and 2 is applicable to this embodiment. The resistance element 18 is fabricated by the same method as set forth in connection with the first embodiment of the invention. The element 18 thus obtained is formed with a disk of 40 mm in diameter and 30 mm in thickness. The coating agent is weighted, so that it contains $Bi_2O_3$ (5-60 weight %), $Sb_2O_3$ (5-60 weight %) and $SiO_2$ (1-30 weight %) as a raw material. Afterwards, the weighted compound is sufficiently mixed by using water so as to form a coating slurry. This coating agent is coated on the inside surface of the capsule 12 serving as a sintering vessel shown in FIGS. 1 and 2 or on an auxiliary means 24 and then is dried. The element 18 containing a ZnO as a major component is accommodated in the capsule 12. The capsule 12 is covered with a cap member 22, thereby rendering the interior thereof to be substantially air-tight. In this air-tight condition, when the element is sintered at a temperature range from 1,000° C. to 1,400° C. (preferably, from 1,100° C. to 1,300° C. in view of an electric characteristic of the element), the mixture coated in the capsule 12 reacts. As a result, the compound produced partially vaporizes and is spattered, with the result that the atmosphere is filled with these metal oxides, thereby vapor-solid reacting with ZnO existing on the surface of the element 18 or an additive mixture. Thus, an insulating layer of high resistance is formed on the surface of the element 18.

In the above vapor-solid reaction, $Sb_2O_3$ selected from $Bi_2O_3$, $Sb_2O_3$ and $SiO_2$ is changed into $Sb_2O_4$ at 570° C. and starts to sublimate at about 920° C. When the temperature is above 1,000° C., $Sb_2O_4$ becomes active. $Bi_2O_3$ is melted at 820° C. The atmosphere in the sintering vessel is filled with the high concentration of antimony oxide and bismuth oxide.

It is here noted that the melting point of $SiO_2$ is much higher than that of other materials and the vaporizing pressure thereof is low. Accordingly, in connection with $SiO_2$, in accordance with sublimation of $Sb_2O_3$ and vaporization of $Bi_2O_3$, $SiO_2$ is spattered, and then arrives at the surface of the element 18 and reacts thereon.

The element 18 is shrunk by 40 percent in terms of volume ratio at a temperature region from 800° C. to 1,000° C. As a result a, crystalline layer, containing such as $Zn_2SiO_4$, pyroclore, $Zn_{2.33}Sb_{0.67}O_4$, $Bi_2O_3$, or $Bi_2O_3$-$Cr_2O_3$ in addition to ZnO, is formed. $Bi_2O_3$ included in the surface of the element starts to vaporize as the temperature elevates. However, the amount of vaporization is considerably suppressed due to the atmosphere of $Bi_2O_3$ produced in the sintering vessel. $Sb_2O_4$, $Bi_2O_3$ and $SiO_2$ in the atmosphere reacts with the element, thereby starting to form $Zn_{2.33}Sb_{O.67}O_4$ or $Zn_2SiO_4$ on the surface thereof. When the temperature is above 1,000° C., $Zn_{2.33}Sb_{0.67}O_4$ formed on the side surface of the element, $Zn_2SiO_4$ and $SiO_2$ which are placed in reacted condition reacts with $Zn^{2+}$ diffusing from the interior of the element, thereby forming $Zn_{2.33}Sb_{0.67}O_4$, $Zn_2SiO_4$ and $Bi_2O_3$. These compounds are formed together with the element 18. The $Bi_2O_3$ exists in the liquid state during sintering, thereby activating to uniformely proceed the sintering reaction between the element and the insulating layer being formed. Thus, the insulating layer has a fine and uniform crystalline structure free from pinholes and with a thickness of 40 to 50μ. As a result, the layer formed on the side surface of the element is crystalline phase containing $Zn_2SiO_4$ and $Zn_{2.33}Sb_{0.67}O_4$.

Figure 16A:
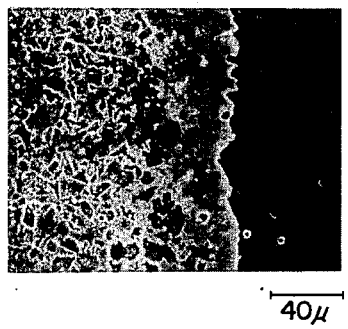
FIGS. 16A to 16H are photos each illustrating an insulating layer observed by an X-ray microanalyzer.
Figure 16B:
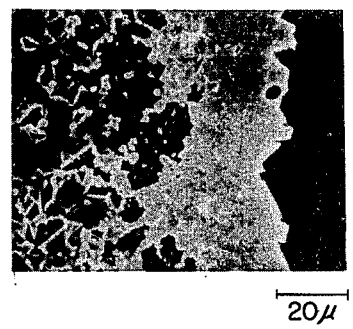
Figure 16C:
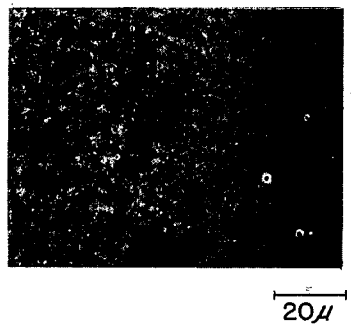
Figure 16D:
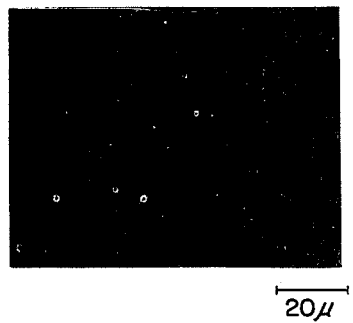
Figure 16E:
Figure 16F:
Figure 16G:
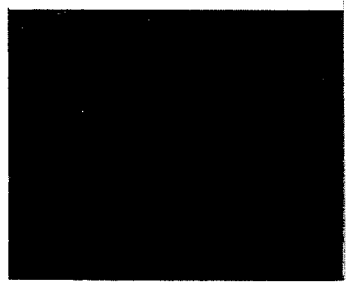
Figure 16H:
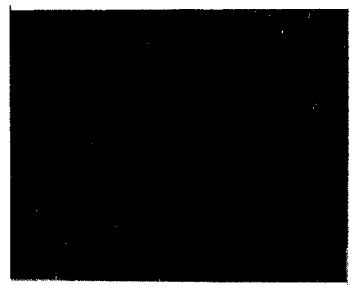

FIG. 16A to 16H are photos each illustrating a condition of an insulating layer formed on the surface of the element as previously mentioned by an X-ray microanalyzer. FIGS. 16A and 16B are photos each illustrating a secondary electron image, wherein the scale of FIG. 16B is twice as large as FIG. 16A. FIGS. 16C to 16H are photos each illustrating a characteristic X-ray image of Sb, Si, Bi, Zn, Mn and Co. As understood from FIGS. 16 and 19, it is seen that the insulating layer is formed so that $Zn_{2.33}Sb_{0.67}O_4$ and $Zn_2SiO_4$ are contained as a major component and the thickness thereof is 40 to 50μ.

Figure 17:
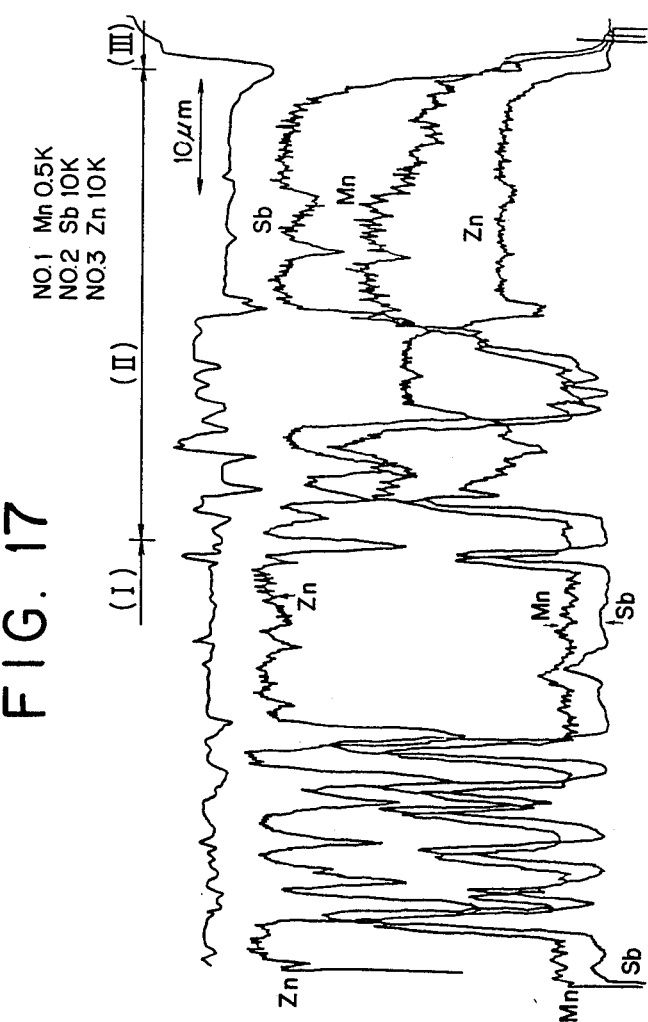
FIGS. 17 and 18 are graphs each illustrating a line analysis of an X-ray microanalyzer.
Figure 18:
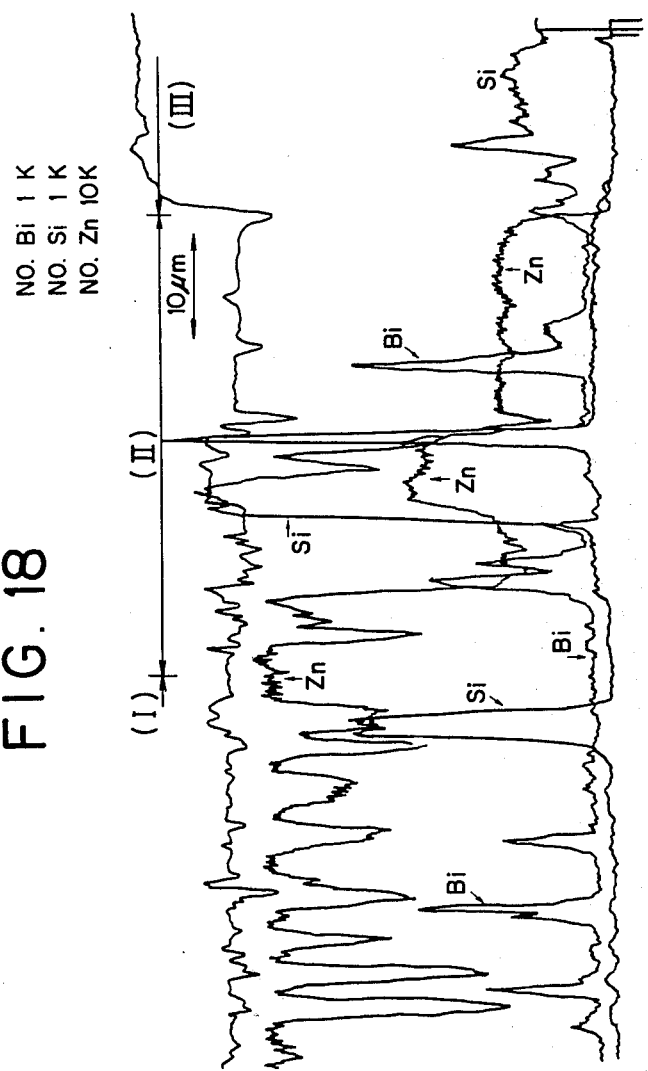

FIGS. 17 and 18 are graphs each showing a line analysis data of an element formed by sintering by X-ray microanalyzer. For instance, No. 3 Zn 10K shown on the right hand side at the upper portion of the Figure denotes 10 Kcps (Kilo count per second) of Zn in a full scale size.

As shown in FIG. 17, at the side surface insulating layer portion (II), there exists a large quantity of Sb and a Zn, and small quantity of Mn. From this, it is seen that Zn and Mn are diffused from the inside of the element (I) to that of the layer, and then solid-soluted therein.

Further, it is seen that, from FIG. 18, there exist Si and Bi in the layer. (III) designates a molded portion. The thickness thereof is about 40 to 50μ. in the spinel formed on the side surface of the element, Co, Mn and Cr existing in the element are solid-soluted. In the $Zn_2SiO_4$, Co and Mn are solid-soluted. From these data, it is known that the spinel and $Zn_2SiO_4$ formed on the surface during sintering sufficiently reacts with the element.

Figure 19:
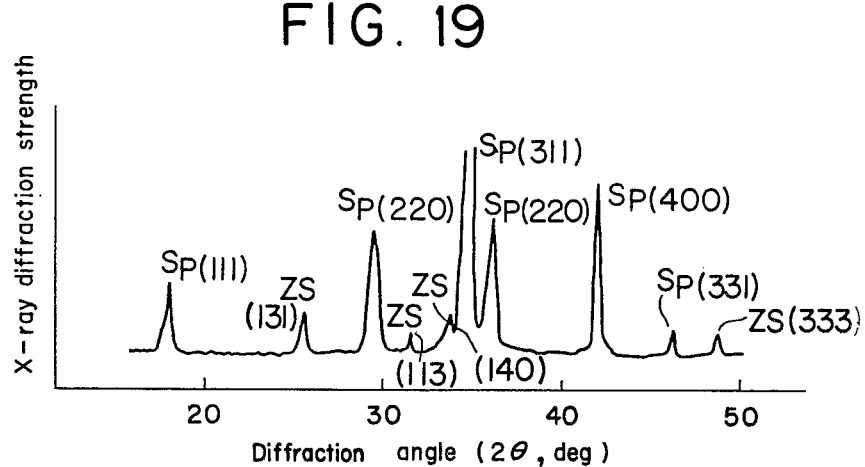
FIG. 19 is a graph illustrating an X-ray diffraction of an electrically insulating film.

As is clear from an X-ray diffraction profile shown in FIG. 19, the insulating layer is formed so as to contain $Zn_{2.33}Sb_{0.67}O_4$ (spinel) and $Zn_2SiO_4$, as a measure component. In the figure, Sp denotes a spinel ($Zn_{2.33}Sb_{0.67}O_4$) and Zs denotes a zincsilicate ($Zn_2SiO_4$).

Figure 20:
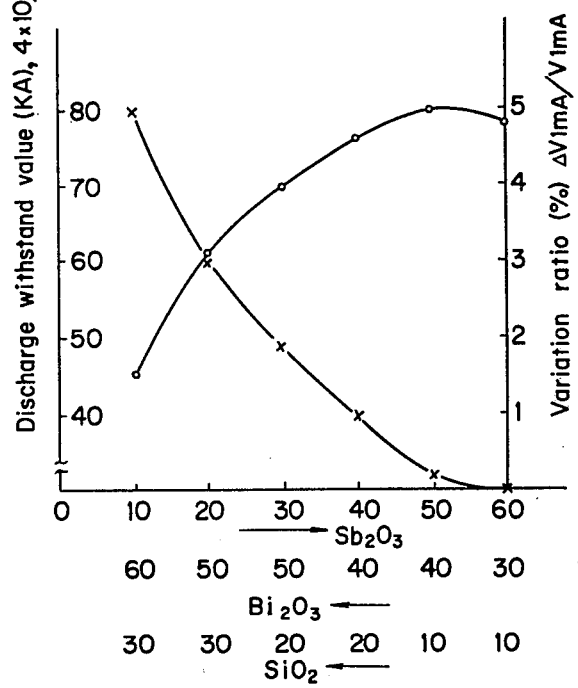
FIG. 20 is a graph illustrating a change of mixing ratio between $Sb_2O_3$, $Bi_2O_3$ and $SiO_2$, and electric characteristics of the element.

FIG. 20 is a graph illustrating electrical characteristics inherent in the element when the formed element is sintered in the sintering vessel by varying the mixing ratio between $Sb_2O_3$, $Bi_2O_3$ and $SiO_2$. In FIG. 20, X denotes $\Delta V1mA/V1mA$ and, O denotes discharge withstand voltage (4×10 μs, two times). It is seen that the discharge withstand voltage lowers according as the amount of $Bi_2O_3$ and $SiO_2$ increases.

According to the third embodiment, the element is fabricated by the steps of coating a mixture containing $Sb_2O_3$, $Bi_2O_3$ and $SiO_2$ on the inner surface of the sintering vessel as a coating agent, and sintering the ZnO element in the atmosphere of $Sb_2O_3$ and thereby making it possible to fabricate the element. For this reason, it is difficult to vaporize $Bi_2O_3$ the ZnO element. Accordingly, this makes it possible to fabricate a non-linear voltage dependent resistor having a good non-linear V-I characteristic, and particularly good electric characteristics, such as discharge withstand voltage. Since $Bi_2O_3$ urges the formation of an insulating layer, it is possible to form an insulating layer of high resistance on the side surface of the element in the region of the sintering temperature suitable for the element.

The insulating layer, as compared with the coating of the epoxy resin, has good electric characteristics such as corona withstand characteristics or arc withstand characteristics. Further, it has the same characteristics as that fabricated by coating and sintering an inorganic side surface paste.

The spattering of $Bi_2O_3$ from the ZnO element is suppressed, thereby making it possible to fabricate a uniform element. Accordingly, it is possible to obtain the insulating layer in which the element and the insulating layer are densely packed. The insulating layer has a fine and uniform crystalline structure free from pinholes. It is sufficient to sinter the ZnO element in an atmosphere of metal oxide. Accordingly, as compared with the method of coating an inorganic side surface paste, it is unnecessary to take into consideration a contraction ratio between the element and the inorganic side surface paste, thereby making it easy to obtain a side surface insulator of high resistance. Because of omitting the presintering step of the element, the fabricating step of the element is simplified to reduce the cost thereof.

As is clear from the foregoing, a method of making a non-linear voltage dependent resistor according to the third embodiment of the invention is characterized in that ZnO element is sintered in an atmosphere containing a mixture of bismuth oxide, antimony oxide and silica oxide. This makes it possible to form an insulating layer having a fine and uniform crystalline structure. Further, this makes it possible to form the resistor so that the element and insulating layer are densely packed. Further, it is possible to fabricate a non-linear voltage dependent resistor which makes it possible to reduce the deterioration in characteristic, increase the voltage non-linearity and improve electric characteristics. Reference is finally made to the embodiment of the invention. A method of making a non-linear voltage dependent resistor comprises the steps of (a) arranging a vaporizable molecular compound and a vaporization retarding compound for retarding a vaporization of the vaporisable molecular compound at a sintering temperature within a sintering vessel, and (b) forming a layer consisting of high insulation material due to a vapor-solid reaction in the atmosphere of the vaporizable molecular compound.

The vaporizable molecular compound preferably contains an antimony oxide, a bismuth oxide, or a silicon oxide. The vaporization retarding compound preferably contains ZnO (zinc oxide) or $SiO_2$ (silicon oxide).

For instance, assuming that the coating agent contains ZnO and $SiO_2$ as the vaporization retarding compound in addition to $Sb_2O_3$. In this instance, the vaporization retarding effect is attained as follows;

During a vapor-solid phase reaction, ZnO reacts with $Sb_2O_3$ at a heating process having a temperature range from an initial heating temperature to 1000° C. as expressed by equation (1)

$$ZnO + Sb_2O_3 + O_2 \rightarrow ZnSb_2O_6 \qquad (1)$$

As a result, $ZnSb_2O_6$ is formed about 600° C. to 700° C. Until the temperature reaches 900° C., the amount of $ZnSb_2O_6$ increases, while when the temperature is above 900° C., it decreases.

Simultaneous with this, the following reaction proceeds as expressed by equation (2).

$$7ZnO + Sb_2O_3 + O_2 \rightarrow Zn_7Sb_2O_{12} \qquad (2)$$

With this reaction, $Zn_7Sb_2O_{12}$ is formed from about 800° C., afterwards the amount thereof increases.

Further, there occurs a reaction between ZnO and $SiO_2$ as expressed by equation (3).

$$2ZnO + SiO_2 \rightarrow Zn_2SiO_4 \qquad (3)$$

With this reaction, $Zn_2SiO_4$ is formed from about 800° C.

Thus, the vaporization of $Sb_2O_3$ is suppressed due to the reaction expressed by equations (1) and (2). The reaction ratio of ZnO which reacts with $Sb_2O_3$ is lowered by the reaction of $SiO_2$ expressed by equation (3). However, As is understood from a change in a crystal structure of $7ZnO\text{-}Sb_2O_3\text{-}SiO_3$ occuring during heating, when the temperature is above 900° C., $ZnSb_2O_6$ is changed into $ZnSb_2O_{12}$. As a result, it is considered that the vaporization of $Sb_2O_3$ is suppressed due to the equations (1) and (2).

Accordingly, in order to vaporize $Sb_2O_3$, the amount required for equations (1) and (2) is required. For this reason, the composition ratio between $Sb_2O_3$, ZnO and $SiO_2$ is determined as follows; From equation (2), $Sb_2O_3/ZnO > 1/7$, from equation (3), $ZnO/SiO_2 > 2$. Due to these inequalities, $Sb_2O_3/SiO_3 > 2/7$ holds. Since the amount of $Sb_2O_3$ existing in the compound is more than that required for the abovementioned equations, the remaining amount of $Sb_2O_3$ vaporizes about 1000° C. The vaporization in this instance is retarded as compared with that when using solely $Sb_2O_3$ because of the fact that $Sb_2O_3$ is consumed in the abovementioned reaction.

Figure 21:
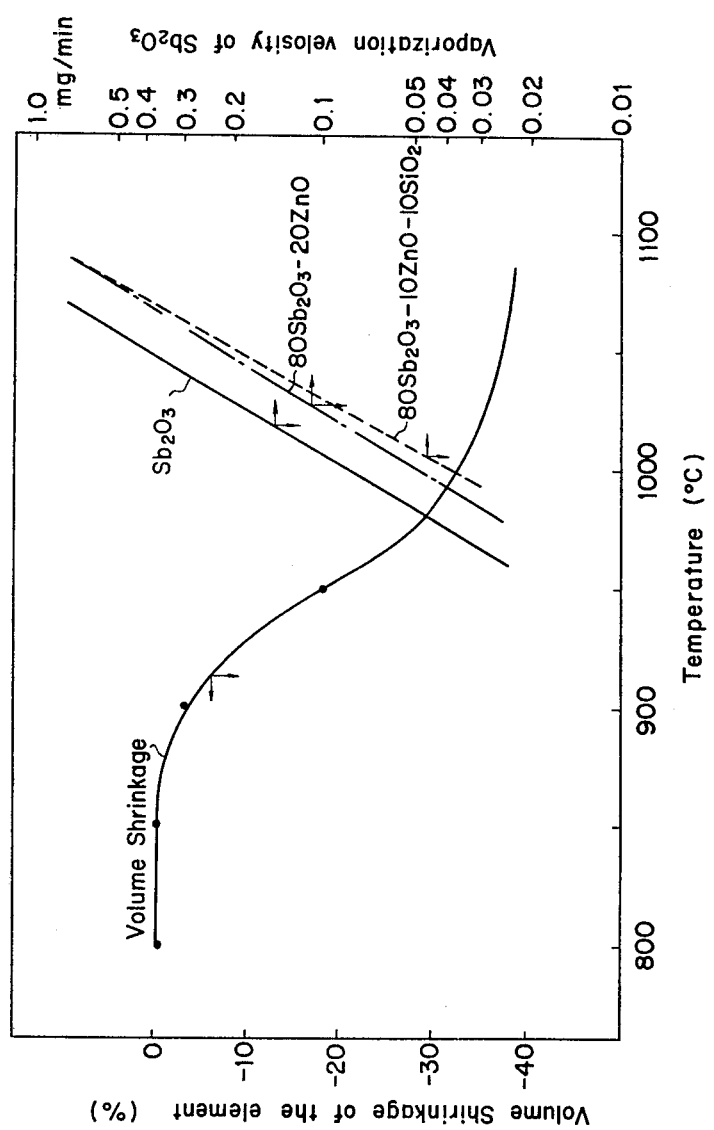
FIG. 21 is a graph illustrating a volume shrinkage ratio of the element and the vaporization speed of $Sb_2O_3$ with respect to a sintering temperature.

FIG. 21 is a graph illustrating a volume shrinkage ratio of the element and the vaporization speed of $Sb_2O_3$ with respect to a sintering temperature, wherein the degree of vaporization of $Sb_2O_3$ is represented in connection with the following three cases; One is that solely $Sb_2O_3$ is used, Second is that ZnO is used in addition to $Sb_2O_3$, and Third is that ZnO and $SiO_2$ are used in addition to $Sb_2O_3$, which case corresponds to that described above.

According to the last mentioned embodiment, $Sb_2O_3$ existing in the coating paste reacts with ZnO and/or $SiO_2$, the vaporization of $Sb_2O_3$ is retarded. For this reason, after the ZnO element is sufficiently shrunk so that gas included therein is discharged, there occurs a vapor-solid phase reaction, thereby making it possible to eliminate remaining gas. Accordingly, as compared with the abovementioned first to third embodiments, this embodiment ensures that the resistor and the coating layer are further closely packed and makes it possible to further improve electric characteristics thereof, such as, current discharge withstand value, corona withstand characteristic, or arc withstand characteristic.

Although several preferred embodiments of the present invention have been illustrated and described, it is believed evident to those skilled in the art that many changes and variations may be made without departing from the spirit and scope of this invention. Accordingly, this invention is to be considered as limited only by the following claims.

What is claimed is:

1. A method of making a non-linear voltage-dependent resistor containing a ZnO element including zinc oxide as its major component wherein the improvement comprises the step of forming a layer comprised of high insulating material due to a vapor-solid reaction in an atmosphere of a vaporizable molecular compound which reacts with the zinc oxide at a sintering temperature.

2. A method of making a non-linear voltage-dependent resistor as defined in claim 1, wherein said vaporizable molecular compound contains an antimony oxide.

3. A method of making a non-linear voltage-dependent resistor as defined in claim 1, wherein said vaporizable molecular compound contains an antimony oxide and a bismuth oxide.

4. A method of making a non-linear voltage-dependent resistor as defined in claim 1, wherein said vaporizable molecular compound contains an antimony oxide, a bismuth oxide, and a silicon oxide.

5. A method of making a non-linear voltage-dependent resistor containing a ZnO element including zinc oxide as its major component
the improvement wherein;
the method comprises the steps of arranging a vaporisable molecular compound which reacts with said zinc oxide at a sintering temperature within a sintering vessel, and forming a layer comprised of high insulation material due to a vapor-solid reaction in an atmosphere of said vaporizable molecular compound.

6. A method of making a non-linear voltage dependent resistor containing a ZnO element including zinc oxide as its major component
the improvement wherein;
the method comprises the steps of mounting the ZnO element within a sintering vessel in which a vaporizable molecular compound is formed, maintaining the temperature within said sintering vessel at a predetermined range to produce an atmosphere of the antimony oxide, and sintering the ZnO element in the atmosphere of said vaporizable molecular compound thereby to form an electrically insulating layer.

7. A method of making a non-linear voltage-dependent resistor as defined in claim 6, wherein said vaporizable molecular compound contains an antimony oxide.

8. A method of making a non-linear voltage-dependent resistor as defined in claim 6, wherein said vaporizable molecular compound contains an antimony oxide and a bismuth oxide.

9. A method of making a non-linear voltage-dependent resistor as defined in claim 6, wherein said vaporizable molecular compound contains an antimony oxide, a bismuth oxide, and a silicon oxide.

10. A method of making a non-linear voltage-dependent resistor containing a ZnO element including zinc oxide as its major component
the improvement wherein;
the method comprises the steps of
(a) arranging a vaporizable molecular compound which reacts with the zinc oxide and a vaporization retarding compound for retarding a vaporization of said vaporizable molecular compound at a sintering temperature within a sintering vessel, and
(b) forming a layer comprised of high insulation meterial due to a vapor-solid reaction in an atmosphere of said vaporizable molecular compound.

11. A method of making a non-linear voltage dependent resistor as defined in claim 10, wherein said vaporization retarding compound contains a zinc oxide.

12. A method of making a non-linear voltage dependent resistor as defined in claim 10, wherein said vaporization retarding compound contains a zinc oxide and a silicon oxide.

13. A method of making a non-linear voltage dependent resistor formed of a bulk element comprising zinc oxide as its major part and as additives at least one of an antimony oxide, a bismuth oxide, and a silicon oxide, the improvement wherein
the method comprises the steps of:
(a) placing the bulk in an atmosphere of a gaseous molecular compound comprising an antimony oxide, and
(b) forming an electrical insulating layer on the side surface of the bulk due to a chemical reaction between the gaseous phase of said molecular compound and a solid phase of the bulk element.

14. A method of making a non-linear voltage dependent resistor as defined in claim 13, further comprising the step of heating said molecular compound of an antimony oxide to a temperature above 1,000° C.

15. A method of making a non-linear voltage dependent resistor as defined in claim 13 wherein said bulk is formed by pressing a mixture consisting of a powdered zinc oxide and at least one of an antimony oxide, a bismuth oxide, and a silicon oxide.

16. A method of making a non-linear voltage dependent resistor as defined in claim 13 wherein said forming step comprises the step of sintering said bulk element in the atmosphere of said gaseous molecular compound.

17. A method of making a non-linear voltage dependent resistor as defined in claim 16 wherein said placing step further comprises the step of placing said bulk element in a sintering vessel having a support for said bulk element formed of a mixture including zinc oxide.

18. A method of making a non-linear voltage dependent resistor as defined in claim 17 wherein said support formed of a zinc oxide mixture comprises a granulated powder disposed between said bulk element and a base member of said sintering vessel.

19. A method of making a non-linear voltage dependent resistor as defined in claims 17 or 18 wherein said sintering vessel includes a seating member formed of zinc oxide for preventing the formation of an insulating coating on a top surface of said bulk element.

20. A method of making a non-linear voltage dependent resistor as defined in claim 13 wherein said placing step comprises the steps of
placing said bulk element in a sintering vessel having a support for said bulk element in an inner surface disposed therein and spaced apart from the side surface of said bulk element,
coating at least a portion of said inner surface within said sintering vessel with a coating agent comprising at least one of antimony oxide, bismuth oxide, and silicon oxide for forming the side surface insulating layer, and
heating said sintering vessel and said bulk element to a predetermined temperature range for forming said atmosphere of at least one of antimony oxide, bismuth oxide and silica oxide.

21. A method of making a non-linear voltage dependent resistor as defined in claim 20 wherein said placing step further comprises the step of placing a detachable auxiliary member, having said inner surface coated by said coating agent formed as a part thereof, in said sintering vessel thereby protecting said sintering vessel from deterioration and heat deformation.

22. A method of making a non-linear voltage dependent resistor as defined in claim 20 wherein said heating step comprises the steps of: sintering said bulk element by heating the bulk element to a temperature selected to be below a predetermined temperature at which said reaction between the gaseous phase of said molecular compound and a solid phase of the bulk elements starts, thereby shrinking said bulk element, and
thereafter heating the bulk element at the predetermined temperature and for a time sufficient to maintain the vapor and solid phase reaction in said atmosphere.

23. A method of making a non-linear voltage dependent resister as defined in claim 13 wherein said forming step comprises the step of reacting the gaseous phase of said molecular compound with a solid phase of said bulk element.

* * * * *